Patented June 26, 1923.

1,460,179

UNITED STATES PATENT OFFICE.

WILLIAM M. RUTHRAUFF, OF PHILADELPHIA, PENNSYLVANIA.

DENTIFRICE.

No Drawing.   Application filed April 24, 1920. Serial No. 376,307.

*To all whom it may concern:*

Be it known that I, WILLIAM M. RUTHRAUFF, a citizen of the United States, residing at Coronado Apartments, in the county of Philadelphia, city of Philadelphia, State of Pennsylvania, have invented a certain new and useful Improvement in Dentifrice, of which the following is a specification.

This invention relates to dentifrices and has for its object the production of a dentifrice which will serve as an efficient digestant and remover of the mucin plaque upon human teeth, and be otherwise beneficial.

In my former Patent No. 1,135,250, patented March 23, 1915, it is correctly explained that the primary cause of tooth decay is a film or mucin plaque deposited on the teeth. This plaque harbors bacteria, which generates lactic acid and etch out the surface of the tooth under the film, roughening the tooth and causing decay. The said patent discloses a proteolytic dentifrice comprising, as a preferred embodiment, an acid activated proteolytic enzyme, and acid activator for the enzyme, and an abrasive.

In the patent alluded to, the acid selected for the specific preferred activator is acid calcium phosphate, though it is stated other acids may be employed and fruit acids are mentioned.

The patent emphasizes the function of an acid ingredient, as active agency in the mouth, which remains in the mouth and serves to activate the enzyme; as a consequence of the presumption of the presence of an active foreign acid in the mouth, during the digesting operation, stress is laid in the patent on the consideration of the possible decalcifying action of the acid on the teeth, and comparatively innocuous acids are suggested, such as for instance fruit acids while in the specific preferred form disclosed in the patent, the acid employed (hydrochloric) has already combined with tribasic calcium phosphate (tooth material) to form mono-basic calcium phosphate. The latter is present in the dentifrice in excess of the combining amount, (i. e. in excess of the amount necessary to satisfy the acid); the excess serving as an abrasive.

Further extensive investigations, clinical and laboratory, and a study of the application of the proteolytic enzymes, including the acid activated enzymes, such as pepsin, have led me to the discovery of certain principles which in proper combination and application serve to readjust the values previously assigned by me to the various functioning agencies involved in the digestion of mucin plaques in the human mouth; and particularly make it possible (*a*) to enlarge the field from which ingredients of a proteolytic dentifrice may be drawn substantially without preference, (*b*) to enlarge the variety of acids which may be employed and their range of concentration, (*c*) to permit within wide limits, the determination of acid concentration in response to considerations quite foreign to the digesting operation to be performed by the dentifrice (*d*) to enlarge the range of forms in which this dentifrice may be embodied, (*e*) to take into account practical considerations such as the capacity of the dentifrice to be kept for long periods without deterioration; all while preserving the full digestive capacity, and general efficiency, previously considered by me to be present to best advantage in the preferred specific combination disclosed in my prior patent.

The character of the invention may best be explained from the statement of the principles whose discovery, application and combination brought into being, as follows:

I have discovered:

First; that in the normal operation of brushing the teeth; when a dentifrice containing an active proteolytic enzyme, such for instance as pepsin, is brought intimately into contact with a mucin plaque, the pepsin undergoes immediately a process technically known as "adsorbtion" by the mucin plaque.

Second, that in and about the mucin plaque, are found certain acids, primarily lactic acid, which are manufactured by the caries producing bacteria harbored by the plaque. These acids, and primarily the lactic acid, maintain their full power against the tooth by reason of the fact that they are concentrated in and about the plaque, and under it, and therefore are not readily accessible to alkaline saliva and other secretions of the mouth which otherwise might neutralize or wash them away.

The mere bringing of a living proteolytic enzyme (such as pepsin) in solution, into intimate contact with the mucin film, results in the "adsorbtion" of the enzyme by the plaque; subsequently the enzyme is activated by the lactic and other acids existing in somewhat concentrated form in and about the plaque, and proceeds upon a mucin digesting operation.

It will be immediately apparent that the result of this action is the digestion of the mucin plaque irrespective of the time consumed in brushing the teeth or of the time wherein the dentifrice is identifiably present in the mouth. The enzyme being adsorbed by the mucin plaque remains intimately attached thereto and therein, and so long as the plaque exists, maintains its full digesting capacity, because the plaque itself produces activating acid, and protects that acid from effective access by the alkaline saliva, or from being dissolved or washed away or otherwise rendered inactive by the secretions of the mouth.

Third: the introduction of an acid dentifrice into the mouth immediately enhances the flow and the alkalinity of the saliva—an acid ingredient in the dentifrice may therefore be neutralized or washed away by the alkaline saliva to an extent which would seriously impair, if not destroy its capacity to activate the enzyme in a mucin digesting operation. Thus any acid, forming an ingredient of a dentrifice, has practically speaking, short period of activity in the mouth; its usefulness as an activator for an enzyme is therefore not great and its capability to damage the teeth is slight except in extreme cases.

Applying the foregoing principles and discoveries to the problem of obtaining maximum efficiency in a mucin digesting, and otherwise beneficial, dentrifice; I have modified the values and intended functions of the acid ingredient. My present object is to bring the enzyme in living condition to the mucin plaque, and thereafter to rely solely on the acid in and about the plaque to activate the enzyme immediately adsorbed thereby.

Referring now to pepsin as illustrative of acid activated enzymes; It is generally true that pepsin if in solution will not maintain its digesting power long enough to be commercially practical in a dentifrice, unless in an acid medium. Nevertheless the acidity necessary to activate the pepsin efficiently to digest, may be much greater than that necessary to maintain it "alive."

Thus, bearing in mind the object previously stated, it is clear that the lower limit of acidity in a dentifrice containing pepsin must be that below which the pepsin would so rapidly deteriorate with reference to its digestive power as to be impracticable in a dentifrice. Any concentration above this limit and below the upper limit next to be described, will serve the purpose of this invention, i. e. would bring a living enzyme against the mucin plaque on the teeth.

The upper limit of acidity in the dentifrice would be (in so far as the digestive function is concerned), that acidity which would destroy or "kill" the enzyme or render it inactive as an ingredient of a dentifrice. This factor of course, varies for different pepsins, for different acids, for different temperatures, etc. and with the time. It is probably true that acid concentrations strong enough to kill, or rapidly deteriorate the enzyme would be unpalatable in a dentifrice, this limitation therefore for practical purposes does not exclude any acidity which would otherwise be practicable.

Between these two limits of acidity we may determine the acid concentration of the dentifrice, as we please, affected not at all by considerations of the digestive function of the enzyme, but by independent and collateral consideration.

I shall illustrate by three specific examples each within the broad scope of the present invention. First: Of course pure pepsin is unknown, commercial pepsin consists of pepsin in an acid combination of some kind. It may vary widely in acidity according to the process by which it was produced etc. without added acid, generally speaking, has little digestive capacity—the acid present being so combined with the pepsin as to be inefficient to activate the pepsin for digestive purposes, yet it will maintain the pepsin alive in solution for a considerable period, and of course the pepsin will be maintained alive for long periods in dry form. Assuming that commercial pepsin in solution or powder would maintain its vitality but be incapable of digesting mucin without added acid, the use of this substance without any added acid whatever, in combination with an abrasive, either in powder form or in solution, would be an illustrative embodiment of this invention. So long as the pepsin is maintained alive—whether it is activated to be substantially capable of digesting or not, the product would be a digesting dentifrice because the digestive capacity of the dentifrice arises from the activation of the pepsin by the lactic acid of the plaque, upon application thereto in the mouth, and the acid ingredient in the dentifrice need not be relied upon as the activator.

The second specific illustration is as follows:

I have previously explained, as in my Patent No. 1,225,362, that acidity in a dentifrice quite independently of any digestive capabilities, is of great value in that it promotes both the flow and the alkalinity of the saliva. A copious flow of alkaline saliva has a markedly beneficial effect upon the teeth. Now in making up a dentifrice, in accordance with the disclosures herein, we may having first established the very wide limits of acidity herein described, thereafter within such limits, determine the concentration of the acid at any point which proves to promote the most favorable conditions in the mouth, without reference at all to the capacity for digesting mucin which that dentifrice will at the same time possess. The particular degree of acidity which would be most effective is of course a variable for the different acids, but can be determined clinically through a suitable series of tests for any specific acid.

A third specific illustration would be as follows: Commercial pepsin is made in a variety of ways; combined with several acids, as hydrochloric, sulphurous, and others, in varying concentrations. While the point has never to my knowledge been established to the point of determining the acidity for some particular pepsin and acid, it is believed that there is a certain optimum acid concentration, in which the pepsin will keep best, i. e. will be least apt to suffer such deterioration as will destroy its capacity when suitably activated, to digest protein. Clearly the acidity which would best prolong the life of the enzyme, must be between that acidity which would fail to maintain it "alive," that which would cause its rapid deterioration thus between the limits above defined. It is known that glycerine will prevent the deterioration of pepsin. Manifestly a dentifrice may remain on the shelves a considerable period of time before being purchased and used. It is desirable therefore to put out such a product, containing pepsin, in such combination as will preserve the pepsin the longest. This can be done by the use of glycerin, also by determining the acid concentration which promotes the longest life of the pepsin in solution quite independently of the acidity which is best for activating the enzyme to digest.

Each of the foregoing possibilities is a particular example of the utilization of a wide range of freedom in determining the acid concentration, made possible and derived from the discovery that the acid ingredient of the dentifrice need not be relied upon solely as the activating agency for the enzyme, in the mouth, but that on the other hand the acid in the dentifrice will quickly disappear, and the acid present in the plaque is the activating agency. Thus, in a nutshell, having first determined merely the limits of acidity within which the enzyme may be brought to the film alive, whether the dentrifrice assume liquid, powder or paste, form, and having worked within those limits, I have thereby accomplished the digesting function; as well as though I attempted to make the dentifrice itself an ideal digesting medium in vitro; I may then within those limits modify the acidity of the dentifrice, so as to achieve additional results quite independent of the digesting function, I may use a wide variety of acids and concentrations of acids put up product in any desired form, use substantially any desired abrasive, which will not interfere with the realization in the product of the desired degree of acidity. Thus the invention while operating upon the same general principles, and obtaining the full beneficial results of the prior patented disclosure goes beyond those results, makes it possible to obtain others of substantial benefit and at the same time very considerably enlarges the field from which ingredients may be chosen.

As a specific illustration of the application of the foregoing discoveries, the following is the composition of a preferred embodiment of a dentifrice made up in accordance therewith.

Take any quantity of talc, say 58 ounces, add desired flavoring extract, such as oil of peppermint, in desired quantity, then add 8 dr. gum tragacanth. To this, add 32 fluid ounces solution of pepsin acidulated with lactic acid to produce a total acidity (made up from the acidity of the added lactic acid and that already present in the pepsin) of 2%, to which may be added any desired quantity of glycerine or other smoothering medium, the whole being intimately and thoroughly mixed together.

In this dentifrice the total acidity of 2% is below the upper limit of acidity, (somewhat over 12%), above which the acidity is so strong as to cause the enzyme to deteriorate rapidly, and above the acidity which would fail to keep it alive. The acidity of 2% selected is below the acidity which would most effectively activate the pepsin to digest in vitro, this being an acidity in the neighborhood of 10% according to tests; but the point is immaterial as previously explained. The selected acidity is one which is efficient in promoting a copious flow of alkaline saliva. Thus with full realization of the digesting capacity, I obtain additional results as previously explained. In the use of this dentifrice, the acidity serves to maintain the enzyme "alive," it stimulates salivary flow and the alkalinity of the saliva, the acid is then neutralized and the digestion of the plaque proceeds through the activation of the adsorbed pepsin by the lactic acid of the plaque.

I claim:

1. A proteolytic dentifrice comprising a proteolytic acid activated enzyme having therewith associated free acid enough to maintain the enzyme but not enough to activate the same for the active proteolytic action on a mucin plaque, and an abrasive.

2. A proteolytic dentifrice comprising, in combination a proteolytic enzyme, acid in amount sufficient to maintain the enzyme and of a nature to stimulate the flow of saliva and to be substantially neutralized thereby, to free the enzyme for adsorbtion on the mucin plaque, with abrasive and body-forming material.

3. A proteolytic dentifrice comprising a proteolytic enzyme of an acid activated character, free acid having an affinity for tooth structure and an abrasive inert to the acid, the acid being in an amount sufficient to maintain the enzyme, and to be substantially neutralized by a flow of alkaline saliva, to free the enzyme to be adsorbed by the mucin plaque to act thereon.

4. A dentifrice including a proteolytic enzyme, lactic acid, the acidity of the dentifrice being sufficient to maintain the enzyme, and an abrasive inert to lactic acid.

5. A dental cream comprising a proteolytic, acid activated enzyme having therewith associated free acid enough to maintain but not activate the enzyme for active proteolytic action on a mucin plaque.

6. A proteolytic dental cream comprising a proteolytic enzyme of an acid activated character, free acid not inert to tooth structure, flavoring matter, body material and an abrasive, the acid being in an amount sufficient to maintain the enzyme and to be substantially neutralized thereby, while the enzyme is adsorbed by a mucin plaque to act thereon.

In witness whereof, I hereunto subscribe my name this 20th day of April, A. D. 1920.

WILLIAM M. RUTHRAUFF.